United States Patent [19]

McCollister et al.

[11] 4,414,282
[45] Nov. 8, 1983

[54] GLASS CERAMIC SEALS TO INCONEL

[75] Inventors: Howard L. McCollister, Albuquerque, N. Mex.; Scott T. Reed, Albuquerque, N. Mex.

[73] Assignee: The United States of America as represented by the U.S. Department of Energy, Washington, D.C.

[21] Appl. No.: 369,965

[22] Filed: Apr. 19, 1982

[51] Int. Cl.³ .............................................. B32B 15/00
[52] U.S. Cl. ....................................... 428/433; 65/33; 65/43; 65/59.22; 428/450; 501/4; 501/5
[58] Field of Search ........................... 65/59.22, 43, 33; 501/4, 7, 5; 428/433

[56] References Cited
U.S. PATENT DOCUMENTS
4,042,362  8/1977  MacDowell et al. ................... 65/33
4,285,728  8/1981  Babcock et al. ..................... 65/33 X FOREIGN PATENT DOCUMENTS
2451121  10/1973  Fed. Rep. of Germany .......... 65/33

Primary Examiner—Arthur D. Kellogg
Attorney, Agent, or Firm—Armand McMillan; Albert Sopp; Richard G. Besha

[57] ABSTRACT

A glass ceramic composition prepared by subjecting a glass composition comprising, by weight, 65–80% $SiO_2$, 8–16%, $Li_2O$, 2–8%, $Al_2O_3$, 1–8% $K_2O$, 1–5% $P_2O_5$ and 1.5–7% $B_2O_3$, to the following processing steps of heating the glass composition to a temperature sufficient to crystallize lithium metasilicate therein, holding the glass composition at a temperature and for a time period sufficient to dissolve the lithium metasilicate therein thereby creating cristobalite nucleii, cooling the glass composition and maintaining the composition at a temperature and for a time period sufficient to recrystallize lithium metasilicate therein, and thermally treating the glass composition at a temperature and for a time period sufficient to cause growth of cristobalite and further crystallization of lithium metasilicate producing a glass ceramic composition having a specific thermal expansion coefficient and products containing said composition.

22 Claims, 10 Drawing Figures

GLASS CERAMIC SEALS TO INCONEL

The U.S. Government has rights in this invention pursuant to Contract No. DE-AC04-67-DP00789 between the U.S. Government Department of Energy and Western Electric Company.

BACKGROUND OF THE INVENTION

1. Field of the Invention

This invention relates to glass ceramic-to-metal seals and particularly hermetic glass ceramic seals with nickel base alloys.

2. Description of the Prior Art

U.S. Pat. No. 2,392,314 to Dalton discloses glass material for sealing against metal wherein the amount of $Li_2O$ in the glass composition is only 0.8%.

U.S. Pat. No. 3,220,815 to McMillan et al discloses a devitrified glass having an expansion coefficient of $142 \times 10^{-7}$ (col. 5, line 38). This can be used for sealing with Mesmeric steel having a coefficient of $140 \times 10^{-7}$. The glass contains ZnO in addition to $Li_2O$ and $SiO_2$.

U.S. Pat. No. 3,564,587 to Ellis discloses a complex glass composition suitable for sealing against metal.

Borom et al, "Journal of the American Ceramic Society", Vol. 58, pages 385–391 (Sept.-Oct., 1975) discloses in Table I glass compositions of which the ingredients are similar to those disclosed in the present application, but which are not taught to be useful as sealants. Moreover, this reference, as well as the above discussed references, do not teach the four step heat treatment of such glass compositions as is taught in the present application, so that there is a distinct difference between the crystalline microstructures of the glass ceramic compositions of the present invention and those of the prior art.

SUMMARY OF THE INVENTION

It has heretofore been shown that nickel base alloys such as Inconel and Hastelloy are particularly suitable for sealing with certain known hard borosilicate glasses because, with respect to their expansion characteristics, these alloys more nearly resemble said glasses than other previously employed sealing materials.

In making a hermetic seal between these nickel base alloys and glass, it is not only essential that the expansion characteristics of the alloy and the glass be sufficiently well matched, but it is equally desirable that the glass has the highest possible chemical durability, i.e., be corrosion resistant, and have a melting temperature sufficiently low to permit production of the glass in conventional melting units. It is also desirable that the expansion and viscosity be such that the glass is capable of sealing to nickel base alloys. It is further desirable that the glass should have a high mechanical strength so that a seal made thereof can withstand high hydraulic pressures.

The prior glasses used for sealing with the above mentioned alloys have not been entirely satisfactory in all respects and, although any and all of the desirable qualifications may be obtained at the sacrifice of others, heretofore no single glass has possessed all of the above mentioned desirable properties.

One object of the present invention is to avoid the use of conventional ceramics such as alumina that employ metal brazes for bonding the ceramic to the metal.

A second object is to provide a glass ceramic-to-metal seal which is more resistant to internal cracks caused by thermal expansion mismatch such as in a glass to metal seal.

Another object is to provide a product having a glass ceramic-to-metal seal which will withstand elevated temperatures up to about 800° C.

Another object is to produce a glass ceramic which will seal with a nickel base alloy and which will have better chemical durability and mechanical strength than prior sealing glasses used for this purpose.

To these and other ends the present invention includes a novel glass ceramic, a novel process for the preparation of the glass ceramic and articles containing said glass ceramic.

Figure 2:
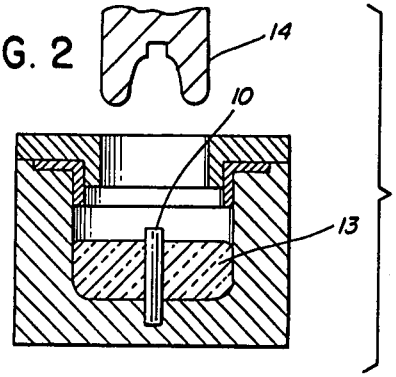

Molten glass is poured into the mold, FIG. 2, and a plunger approaches.

Figure 3:
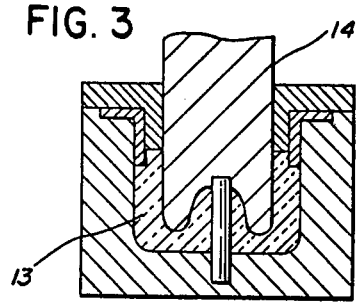

In FIG. 3, the plunger is engaged and has formed the glass.

Figure 4:
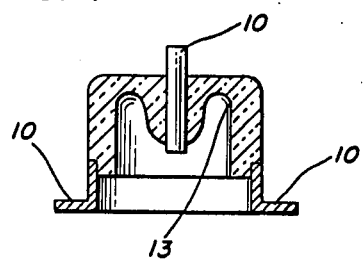

FIG. 4 shows the glass-metal assembly out of the mold and rotated 180°.

Figure 5:
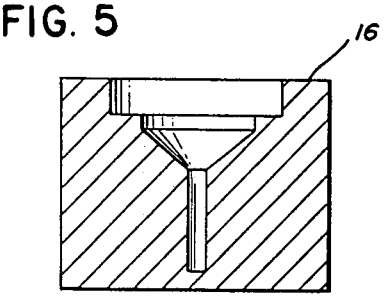

FIG. 5 shows, in schematic cross-sectional view, an apparatus to fuse glass to metal by heating.

Figure 6:
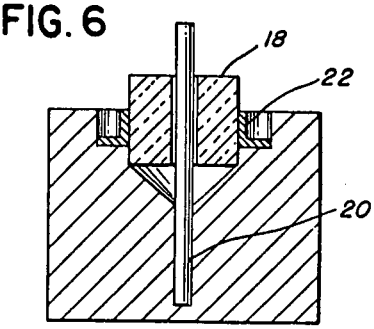

The metal parts and glass preform are shown in place in FIG. 6.

Figure 7:
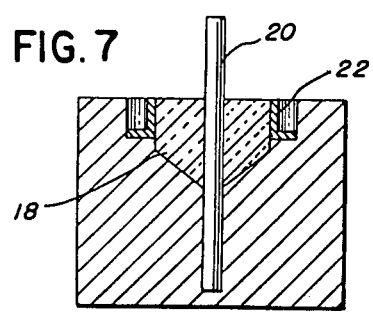

In FIG. 7, the glass has melted and assumed its sealing shape.

Figure 8:
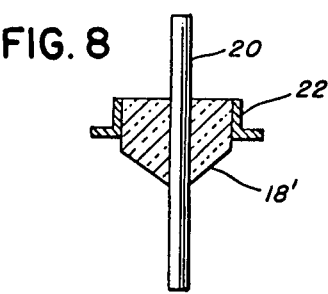

FIG. 8 shows the final metal-glass assembly

Figure 9:
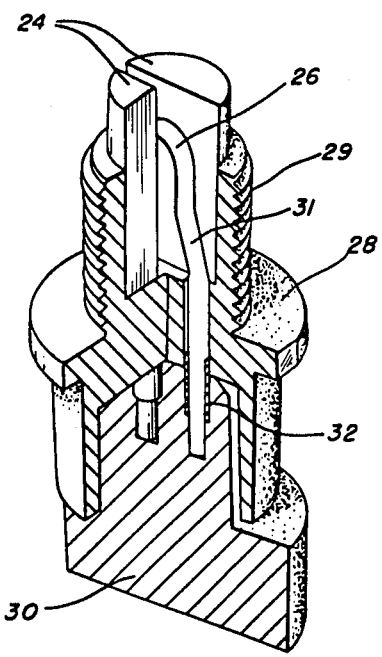

FIG. 9 is a partially broken away perspective view of an electrical header incorporating a glass ceramic seal with the body of a metal shell wherein said seal is obtained by the use of cold glass preforms.

Figure 10:
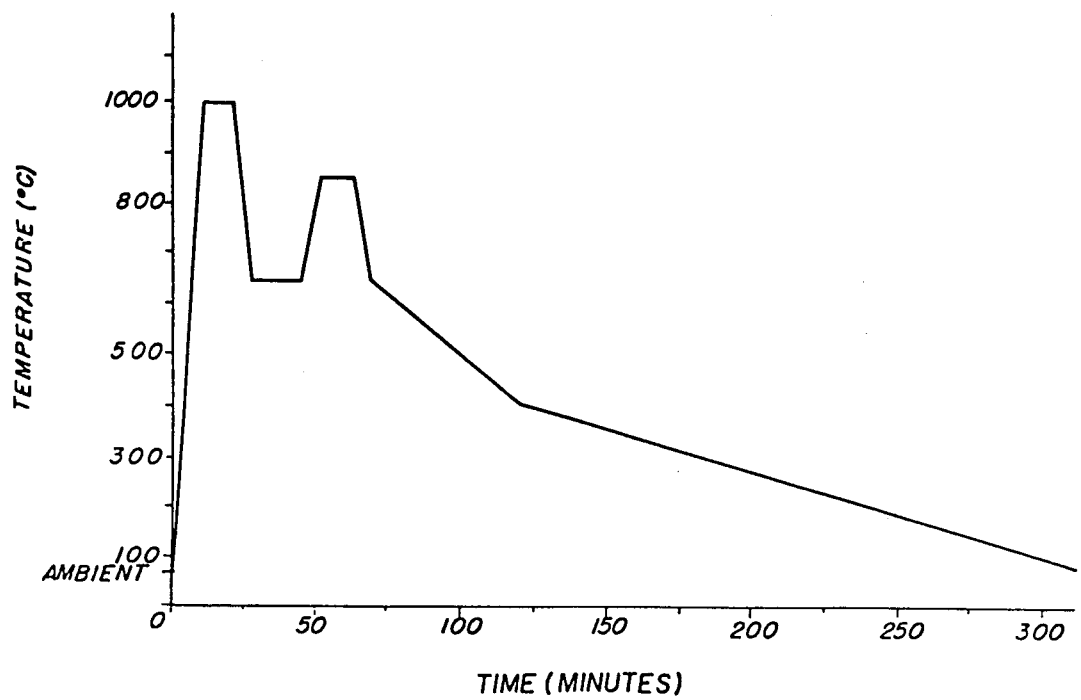

FIG. 10 is a graph representing the crystallizing temperature profile which is employed in the preparation of the header as discussed in Example 4.

DETAILED DESCRIPTION OF THE INVENTION

Glass compositions containing silica, boric oxide, alumina, phosphorus pentoxide and alkali metal oxides, the $SiO_2$ being 65–80%, $B_2O_3$ 1.5–7%, $Al_2O_3$ 2–8%, $P_2O_5$ 1–5% and the alkali metal oxides comprising $K_2O$ 1–8% and $Li_2O$ 8–16% are particularly suitable for sealing with the nickel base alloys specified hereinbelow, and have a better chemical durability and mechanical strength than prior glasses used for this purpose.

In Table I preferred examples of the glass compositions falling within the scope of this invention are given in terms of weight percent as calculated from their respective batches, as well as a prior glass used for sealing nickel base alloys.

The compositions in Table I, being calculated from their respective batches, are not exactly the compositions of the final glasses because there is a small indeterminate loss during melting. This difference is not, however, substantial.

TABLE I

|  | S3-01 | S | Weight % Range | Preferred Range |
|---|---|---|---|---|
| $SiO_2$ | 71.0 | 71.7 | 65–80 | 70–75 |
| $Li_2O$ | 12.5 | 12.6 | 8–16 | 10–14 |
| $Al_2O_3$ | 5.0 | 5.1 | 2–8 | 4–6 |
| $K_2O$ | 4.8 | 4.9 | 1–8 | 3–6 |
| $P_2O_5$ | 2.5 | 2.5 | 1–5 | 2–4 |
| $B_2O_3$ | 3.2 | 3.2 | 1.5–7 | 2–5 |

TABLE I-continued

| | S3-01 | S | Weight % Range | Preferred Range |
|---|---|---|---|---|
| CoO | 1.0 | | | |

In preparing the novel sealing glasses of the disclosed compositional range, the batch ingredients are intimately mixed by hand or in a commercially available blender and heated to such temperatures that all of the glass forming substances are present in the liquid state, thereby enabling the formation of a glass from a homogeneous melt.

Generally, the batch ingredients were mixed well in a blender, and melting was done in a 100% platinum crucible or a 90% platinum-10% rhodium crucible range in an electric furnace at a temperature of about 1500° C. for a time of about 15 hours in air. The batch ingredients were continuously stirred during the melting procedure.

The batch materials employed for preparing the glasses of the invention were of a high purity and selected from commercially available materials. Of course, the components of the batch may be in the form of functionally equivalent phosphates, carbonates, borates or any other form which does not adversely affect the subject glass composition.

Glass having a composition as described above, prepared by the melting together of the components of a batch will not, by simple cooling to solidification, possess the necessary coefficient of expansion, i.e., which will match that of the nickel base alloy to which it is intended to be sealed.

In order to obtain the desired coefficient of expansion in the final glass ceramic seal, it is necessary to subject the solidified glass to the following four step heat treatment:

a. Crystallizing lithium metasilicate ($Li_2O.SiO_2$) by heating up to about 1000° C.;

b. Holding the metasilicate at 950°–1050° C., preferably 975°–1025° C. and most preferably 1000° C. for 5–60 minutes, preferably 10–30 minutes, and most preferably 15 minutes, whereby it is dissolved creating cristobalite nucleii;

c. Cooling to 600–700° C., preferably 625°–675° C., and most preferably about 650° C. and holding for 10 to 120 minutes, preferably 10–60 minutes and most preferably about 15 minutes causing recrystallization of lithium metasilicate; and d. Thermally treating at a temperature of 775°–850° C., preferably 800°–840° C. and most preferably 820° C. for 10 to 120 minutes, preferably 10–60 minutes and most preferably 20 minutes to cause growth of cristobalite and further crystallization of lithium metasilicate producing glass ceramic material of the desired expansion coefficient.

When Inconel 718 (a nickel, chrome, iron alloy sold by Huntington Alloys) is used as a metal to which the glass ceramic material is bonded, the final product may be subjected to an additional precipitation hardening treatment to form an exceptionally high strength product. The precipitation hardening treatment is preferably a two step treatment including the steps of lowering and maintaining the temperature of the product at 700°–750° C., preferably 725° C., for 1 to 8 hours, preferably 2 hours and thereafter lowering and maintaining the temperature of the product at 595°–645° C., preferably 620° C., for 1 to 8 hours, preferably 2 hours. This precipitation hardening treatment is not detrimental to the properties of the glass ceramic.

Careful control of the heat treatment process of the S glass ceramic (Table I) is required to obtain the desired phase assemblage and thermal expansion coefficient ($\alpha$) of 120 to $160 \times 10^{-7}$/°C., preferably $145 \times 10^{-7}$/°C. The glass ceramic contains crystalline phases of lithium metasilicate ($Li_2O.SiO_2$), cristobalite solid solution ($SiO_2$.S.S.), and minor amounts of lithium disilicate ($Li_2O.2SiO_2$). It also contains a residual glass phase rich in oxides of potassium, aluminum and silicon. The presence of cristobalite in the phase assemblage is essential to obtain a high thermal expansion. Thermal treatment of the glass at temperatures outside the range of 950° C. to 1050° C., as compared to 1000° C., does not provide adequate quantities of cristobalite to effect a good glass ceramic to metal seal.

The following Examples are representative embodiments of a glass composition of the present invention and uses thereof.

EXAMPLE 1

| Raw Material | Weight (g) | Finished Product | Finished Product Composition (wt %) |
|---|---|---|---|
| $SiO_2$ | 710.00 | $SiO_2$ | 71.7 |
| $Li_2CO_3$ | 309.10 | $Li_2O$ | 12.6 |
| $Al_2O_3$ | 50.00 | $Al_2O_3$ | 5.1 |
| $K_2CO_3$ | 70.43 | $K_2O$ | 4.9 |
| $H_3BO_3$ | 57.31 | $B_2O_3$ | 3.2 |
| $NH_4H_2PO_4$ | 40.52 | $P_2O_5$ | 2.5 |

The above constituent materials (1,000 g) are introduced into a twin-cone blender and mixed for about $60 \pm 10$ minutes. The resultant mixture may be stored in a covered beaker in a desiccated cabinet or in a drying oven maintained at $125 \pm 10°$ C. for a maximum of seven days prior to use. The above mixture is then stirred in a clean platinum crucible and baked at $1600 \pm 20°$ C. for a minimum of one hour. The glass powder is then melted according to the following procedure. The glass powder is batchwise added to the crucible in a furnace and the temperature is allowed to stabilize at about 1550° C. after each addition of powder until the entire batch of glass powder has been added. A platinum stirrer is then lowered from the top of the furnace into the crucible. The glass melt is stirred at 125 rpm continuously for 15 hours (over night) at $1550 \pm 10°$ C. The stirring blade is then raised out of the glass and the glass is fined for 15 minutes. The glass is then visually inspected for bubbles. If bubbles do exist in the glass, the glass is allowed to fine until all the bubbles are removed.

The following Example is a representative embodiment of the preparation of a glass ceramic seal to Inconel employing the glass composition of the present invention. The glass ceramic seal is prepared using molten glass which is injected into a mold containing pre-positioned nickel base alloy parts.

EXAMPLE 2

Figure 1:
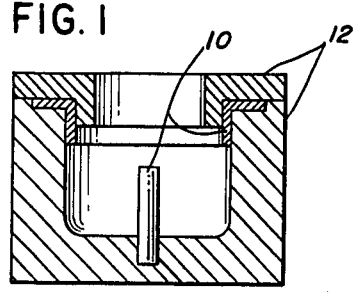
FIG. 1 shows a schematic cross-sectional view of a mold containing alloy parts to be fused to glass.

This Example is directed to the use of the molding equipment which is shown in FIGS. 1–4. In FIG. 1 the metal alloy components 10 are positioned in the mold 12 and are preheated to a sufficiently high temperature so that good wetting of the metal alloy components by the molten glass occurs. As shown in FIG. 2 a charge of molten glass 13 of a composition according to this invention is then placed into the mold, the amount of molten glass being, for example, 50% of the volume in the mold cavity. As shown in FIG. 3 a plunger 14 is then forced into the mold cavity as far as possible and the molten glass charge 13 assumes the shape shown.

After the mold has been cooled sufficiently, the glass ceramic seal to which the metal alloy parts are joined is removed from said mold; see FIG. 4.

The following Examples are representative embodiments of the preparation of a glass ceramic seal to a nickel base alloy in which cold glass preforms are employed. These Examples employ glass preforms having the composition of the present invention the cold glass preforms melt during the four step heat treatment.

EXAMPLE 3

This Example is directed to the use of the molding equipment shown in FIG. 5. The metal pin 20, metal ring 22 and the glass preform 18, which is made from the molten composition prepared in Example 1, are placed in the graphite jig or mold of FIG. 5, in the manner shown in FIG. 6. The heat treatment is then completed whereby the glass preform 18 melts and flows into the mold cavity as shown in FIG. 7. After the heat treatment has been completed the final product may be removed from the mold. The final product, as shown in FIG. 8, includes a metal pin 20 bonded to a metal ring 22 by a glass ceramic material 18′.

EXAMPLE 4

This Example is directed to the preparation of a header, as shown in FIG. 9, which contains a glass ceramic seal between a hair pin 26 and the body 28 of a header. The unit of FIG. 9 is assembled by placing a metal header body 28 (which is formed in Inconel 625, a nickel, molybdenum, chrome alloy sold by Huntington Alloys) on a bottom fixture 30. The bottom fixture 30 contains a pair of longitudinal recesses. A tubular carbon insert 32 is disposed in each of said recesses, respectively. The lower ends, respectively, of a generally U-shaped hair pin 26 are then inserted into each of said recesses. The hair pin 26 contains a bent portion 31 in each leg thereof. Glass preforms 24 are then placed on either side of hair pin 26. The header assembly of FIG. 9 is then subjected to heat treatment in a furnace capable of maintaining an inert atmosphere, such as argon, with reference to FIG. 10. During this heat treatment the glass preforms 24 melt and flow down into the hollow portion of body 28. the temperature is increased from ambient to 1000° C. at 100° C./minute and held at 1000° C. for 10 minutes. The temperature is then decreased from 1000° C. to 650° C. at 50° C./minute and held at 650° C. for 15 minutes. The temperature is then increased from 650° C. to 820° C. at 30° C./minute and held at 820° C. for 20 minutes. The temperature is then decreased from 820° C. to 650° C. at 30° C./minute and then decreased from 650° C. to 400° C. at 5° C./minute and finally decreased from 400° C. to ambient at 2° C./minute.

The crystallized units are then removed from the furnace for disassembly. The header body is thereafter carefully pulled out of the bottom fixture. Prior to electropolish and grinding operations, the headers are inspected and tested as follows to eliminate defective units.

The glass ceramic in the connector end of the header is visually inspected using 10 to 20×magnification. Evidence of cracks in the glass ceramic are cause for rejection. Using a helium leak detector, a leak test on the header is performed. Any detectable leak is cause for rejection.

The metal parts are electropolished using a variable DC power supply with a stainless steel beaker as the negative lead and the metal part as the positive lead. Electropolish is conducted for a total of three minutes. The unit is then rinsed with tap water. Preparation of the electropolishing solution used is as follows.

One part of concentrate is added to three parts by volume phosphoric acid (85% grade). The operating voltage is 5 to 9 volts and the temperature of the solution is maintained at 120° to 130° F. The solution should not be overheated as etching of body occurs at 150° F.

Using the following procedure, the charge cavity in the header is ground to form two individual pins from the hair pin 26 which are properly spaced and sealed within the header.

A 220-grit×0.100-diameter diamond burr is used for grinding the charge cavity at a grinding speed of 60,000 rpm. One diamond burr will grind approximately four headers provided that periodic cleaning of burr is performed.

The bent portions of the hair pin together with the glass ceramic seal allow the space between the ground off ends of said hair pin to be precisely fixed.

EXAMPLE 5

A header was prepared in the same general manner as Example 4 with the following differences in materials and processing steps being employed. Instead of using a single U-shaped hair pin, three individual elongated pins made of Hastelloy C-276 (a nickel, molybdenum, chrome alloy) were employed. A metal shell made from Inconel 718 (a nickel, molybdenum, chrome alloy sold by Huntington Alloys) was utilized instead of the hollow body made from Inconel 625 which was utilized in Example 4. Due to compositional differences between Inconel 625 and Inconel 718, an additional two step precipitation hardening treatment was conducted to increase the strength of the Inconel 718. The unit was therefore treated at 725° C. for two hours and then treated at 620° C. for two hours to precipitation harden the Inconel 718. The final inspecting, grinding and processing steps were conducted in the same general manner as in Example 4.

The above Examples are directed primarily to methods wherein the initial glass compositions are formed into preforms and the preforms are then placed into an explosive header assembly for subsequent bonding to metal parts thereof. However, the process can also be conducted by utilizing a heat treatment wherein molten glass is injected into headers for bonding to metal components thereof. The compositions and methods discussed hereinabove may be utilized to bond a variety of products. The compositions and methods of the present invention are particularly useful for preparing products which are subjected to high temperatures in use.

The invention being thus described, it will be obvious that the same way be varied in many ways. Such variations are not to be regarded as a departure from the spirit and scope of the invention, and all such modifications as would be obvious to one skilled in the art are intended to be included within the scope of the following claims.

What is claimed is:

1. A glass ceramic composition prepared by subjecting a glass composition comprising, by weight, 65-80%

SiO$_2$, 8–16% Li$_2$O, 2–8% Al$_2$O$_3$, 1–8% K$_2$O, 1–5% P$_2$O$_5$ and 1.5–7% B$_2$O$_3$, to the following processing steps:
  a. heating the glass composition to a temperature sufficient to crystallize lithium metasilicate therein;
  b. holding the glass composition at a temperature and for a time period sufficient to dissolve the lithium metasilicate therein thereby creating cristobalite nucleii;
  c. cooling the glass composition and maintaining the composition at a temperature and for a time period sufficient to recrystallize lithium metasilicate therein; and
  d. thermally treating the glass composition at a temperature and for a time period sufficient to cause growth of cristobalite and further crystallization of lithium metasilicate producing a glass ceramic composition having a specific thermal expansion coefficient.

2. The glass ceramic composition as recited in claim 1, having a thermal expansion coefficient $\alpha$ of 120–160×10$^{-7}$/°C.

3. The glass ceramic composition as recited in claim 1, in which the composition of the sealing glass is, by weight, 70–75% SiO$_2$, 10–14% Li$_2$O, 4–6% Al$_2$O$_3$, 3–6% K$_2$O, 2–4% P$_2$O$_5$ and 2–5% B$_2$O$_3$.

4. The glass ceramic composition as recited in claim 1, in which the composition of the sealing glass is, by weight, 71.7% SiO$_2$, 12.6% Li$_2$O, 5.1% Al$_2$O$_3$, 4.9% K$_2$O, 2.5% P$_2$O$_5$ and 3.2% B$_2$O$_5$.

5. The glass ceramic composition as recited in claim 1, wherein the heating of step (a) is conducted at a temerature up to about 1000° C., the holding temperature of step (b) is 950° to 1050° C. and the holding time is 5 to 60 minutes, the composition is cooled to a temperature of 600° to 700° C. and held at said temperature for 10 to 120 minutes in step (c) and wherein the thermal treatment of step (d) is conducted at 775° to 850° C. for a time of 10 to 120 minutes.

6. The glass ceramic composition as recited in claim 5, in which the composition of the sealing glass is, by weight, 70–75% SiO$_2$, 10–14% Li$_2$O, 4–6% Al$_2$O$_3$, 3–6% K$_2$O, 2–4% P$_2$O$_5$ and 2–5% B$_2$O$_3$.

7. The glass ceramic composition as recited in claim 5, in which the composition of the sealing glass is, by weight, 71.7% SiO$_2$, 12.6% Li$_2$O, 5.1% Al$_2$O$_3$, 4.9% K$_2$O, 2.5% P$_2$O$_5$ and 3.2% B$_2$O$_3$.

8. A process for forming a seal between a glass having a thermal expansion coefficient $\alpha$ of 120–160×10$^{-7}$/°C. and a nickel base alloy having substantially the same thermal expansion coefficient, comprising the steps of:
  1. applying a glass having a composition, by weight, of 65–80% SiO$_2$, 8–16% Li$_2$O, 2–8% Al$_2$O$_3$, 1–8% K$_2$O, 1–5% P$_2$O$_5$ and 1.5–7% B$_2$O$_3$ to the nickel base alloy, and subjecting the glass to the following processing steps:
  a. heating the glass composition to a temperature sufficient to crystallize lithium metasilicate therein;
  b. holding the glass composition at a temperature and for a time period sufficient to dissolve the lithium metasilicate therein thereby creating cristobalite nucleii;
  c. cooling the glass composition and maintaining the composition at a temperature and for a time period sufficient to recrystallize lithium metasilicate therein; and
  d. thermally treating the glass composition at a temperature and for a time period sufficient to cause growth of cristobalite and further crystallization of lithium metasilicate producing a glass ceramic composition having a specific thermal expansion coefficient.

9. The process as recited in claim 8, in which the composition of the molten glass is, by weight, 70–75% SiO$_2$, 10–14% Li$_2$O, 4–6% Al$_2$O$_3$, 3–6% K$_2$O, 2–4% P$_2$O$_5$ and 2–5% B$_2$O$_3$.

10. The process as recited in claim 8, in which the composition of the molten glass is, by weight, 70–75% SiO$_2$, 12.6% Li$_2$O, 5.1% Al$_2$O$_3$, 4.9% K$_2$O, 2.5% P$_2$O$_5$ and 3.2% B$_2$O$_3$.

11. A product produced by the process of claim 8.

12. A product produced by the process of claim 9.

13. A product produced by the process of claim 10.

14. An electrical header produced by the process of claim 8.

15. An electrical header produced by the process of claim 9.

16. An electrical header produced by the process of claim 10.

17. The process as recited in claim 8 wherein the heating of step (a) is conducted at a temperature up to about 1000° C., the holding temperature of step (b) is 950° to 1050° C. and the holding time is 5 to 60 minutes, the composition is cooled to a temperature of 600° to 700° C. and held at said temperature for 10 to 120 minutes in step (c) and wherein the thermal treatment of step (d) is conducted at 775° to 850° C. for a time of 10 to 120 minutes.

18. The process as recited in claim 17, in which the composition of the molten glass is, by weight, 70–75% SiO$_2$, 10–14% Li$_2$O, 4–6% Al$_2$O$_3$, 3–6% K$_2$O, 2–4% P$_2$O$_5$ and 2–5% B$_2$O$_3$.

19. The process as recited in claim 17, in which the composition of the molten glass is, by weight, 71.7% SiO$_2$, 12.6% Li$_2$O, 5.1% Al$_2$O$_3$, 4.9% K$_2$O, 2.5% P$_2$O$_5$ and 3.2% B$_2$O$_3$.

20. A product produced by the process recited by claim 17.

21. A product produced by the process recited by claim 18.

22. A product produced by the process recited by claim 19.

* * * * *